(12) United States Patent
Gleckman et al.

(10) Patent No.: US 6,490,104 B1
(45) Date of Patent: Dec. 3, 2002

(54) ILLUMINATION SYSTEM FOR A MICRO DISPLAY

(75) Inventors: Philip Landon Gleckman, Boulder, CO (US); Miller Schuck, Nederland, CO (US)

(73) Assignee: Three-Five Systems, Inc., Tempe, AZ (US)

(*) Notice: Subject to any disclaimer, the term of this patent is extended or adjusted under 35 U.S.C. 154(b) by 0 days.

(21) Appl. No.: 09/952,980

(22) Filed: Sep. 14, 2001

Related U.S. Application Data

(60) Provisional application No. 60/233,298, filed on Sep. 15, 2000.

(51) Int. Cl.[7] .......................... G02B 7/02; G02B 27/00; H01J 5/16
(52) U.S. Cl. .................. 359/819; 359/613; 313/116
(58) Field of Search .................. 359/811, 819, 359/613; 313/110, 113, 116

(56) References Cited

U.S. PATENT DOCUMENTS

| | | | | |
|---|---|---|---|---|
| 4,864,408 A | * | 9/1989 | Bridges | 348/111 |
| 5,272,518 A | * | 12/1993 | Vincent | 250/226 |
| 5,440,197 A | | 8/1995 | Gleckman | 313/110 |
| 5,467,215 A | * | 11/1995 | Lebby et al. | 349/58 |
| 5,596,402 A | * | 1/1997 | Markantes et al. | 283/57 |
| 5,684,354 A | | 11/1997 | Gleckman | 313/110 |
| 5,892,325 A | | 4/1999 | Gleckman | 313/578 |
| 6,043,591 A | | 3/2000 | Gleckman | 313/110 |
| 6,144,508 A | * | 11/2000 | Bransome | 351/223 |
| 6,449,439 | * | 9/2002 | Boyd et al. | 348/333.01 |

OTHER PUBLICATIONS

3M Optical Systems, "How 3M brightness enhancement film works", 1993, 1 pg.
3M Innovation, "Vikuiti Display Enhancement Films for Public Display Applications", 2000, 4 pps.

* cited by examiner

Primary Examiner—Ricky Mack
(74) Attorney, Agent, or Firm—Ingrassia, Fisher & Lorenz, P.C.

(57) ABSTRACT

A compact and efficient illumination system is provided that is particularly suitable for illuminating a micro display and places the light source within the view of the display. In one embodiment, the illumination system comprises a light source, a package for the light source having a reflective surface on at least one side of the light source, and a diffuser opposite the reflective surface in direct view of the light source. The invention further comprises a film stack to receive light through the diffuser, the film stack transmitting light within a maximum exit angle and reflecting substantially all other light to the diffuser.

23 Claims, 2 Drawing Sheets

ILLUMINATION SYSTEM FOR A MICRO DISPLAY

CROSS REFERENCE TO RELATED APPLICATIONS

This application claims the priority of Provisional Application Ser. No. 60/233,298, filed on Sep. 15, 2000.

BACKGROUND OF THE INVENTION

1. Field of the Invention

The invention relates generally to the field of illuminators for small displays. More particularly, the invention relates to a compact light source using a film stack to illuminate a small display.

2. Description of the Related Art

Micro displays of various kinds provide compact high resolution displays for a variety of applications. Such displays are used, for example in helmet, windshield, and visor projection systems as well as in small portable headsets and handsets for private display viewing and for virtual reality systems. Some micro display technologies, such as polysilicon (P-Si) and silicon-on-insulator (SOI), provide a transmissive surface which requires a backlight for illumination. Other types, such as Nematic, Static Random Access Memory (SRAM), Digital Micromirror (DMD), Ferroelectric (FLC) and Liquid Crystal on Silicon (LCoS) are reflective and require a front light. In any such micro display system, there are significant challenges in making a system that is both compact and low powered. Both challenges are eased by reducing light loss. Reducing light loss in the illumination system, whether it is a backlight or front light, allows for a smaller, cooler, lower power illumination system.

One example of an illuminator for a micro display is shown in U.S. Pat. No. 5,684,354 to Gleckman. That patent shows an illuminator with either a bulb 12 or red, green and blue LEDs 12' disposed within a reflective cavity to illuminate the display. An opaque baffle 56 or a wall of the cavity keeps the light source out of the field of view of the display and the optical system to ensure that the light source is not imaged to the viewer. The illumination light comes out of the reflective cavity through an aperture 18 that is covered by a diffuser 20, a film 22 and a corrective color filter 24, if necessary. This illuminator provides an even, well diffused, color corrected source of light for the display. However, the cavity must be large in order to keep the light source out of the view of the display and imaging optics. In addition, the illuminator is inefficient due to the indirect path from the light source to the display.

BRIEF SUMMARY OF THE INVENTION

A compact and efficient illumination system is provided that is particularly suitable for illuminating a micro display and places the light source within the view of the display. In one embodiment, the illumination system comprises a light source, a package for the light source having a reflective surface on at least one side of the light source, and a diffuser opposite the reflective surface in direct view of the light source. The invention further comprises a film stack to receive light through the diffuser, the film stack transmitting light within a maximum exit angle and reflecting substantially all other light to the diffuser.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Figure 1:
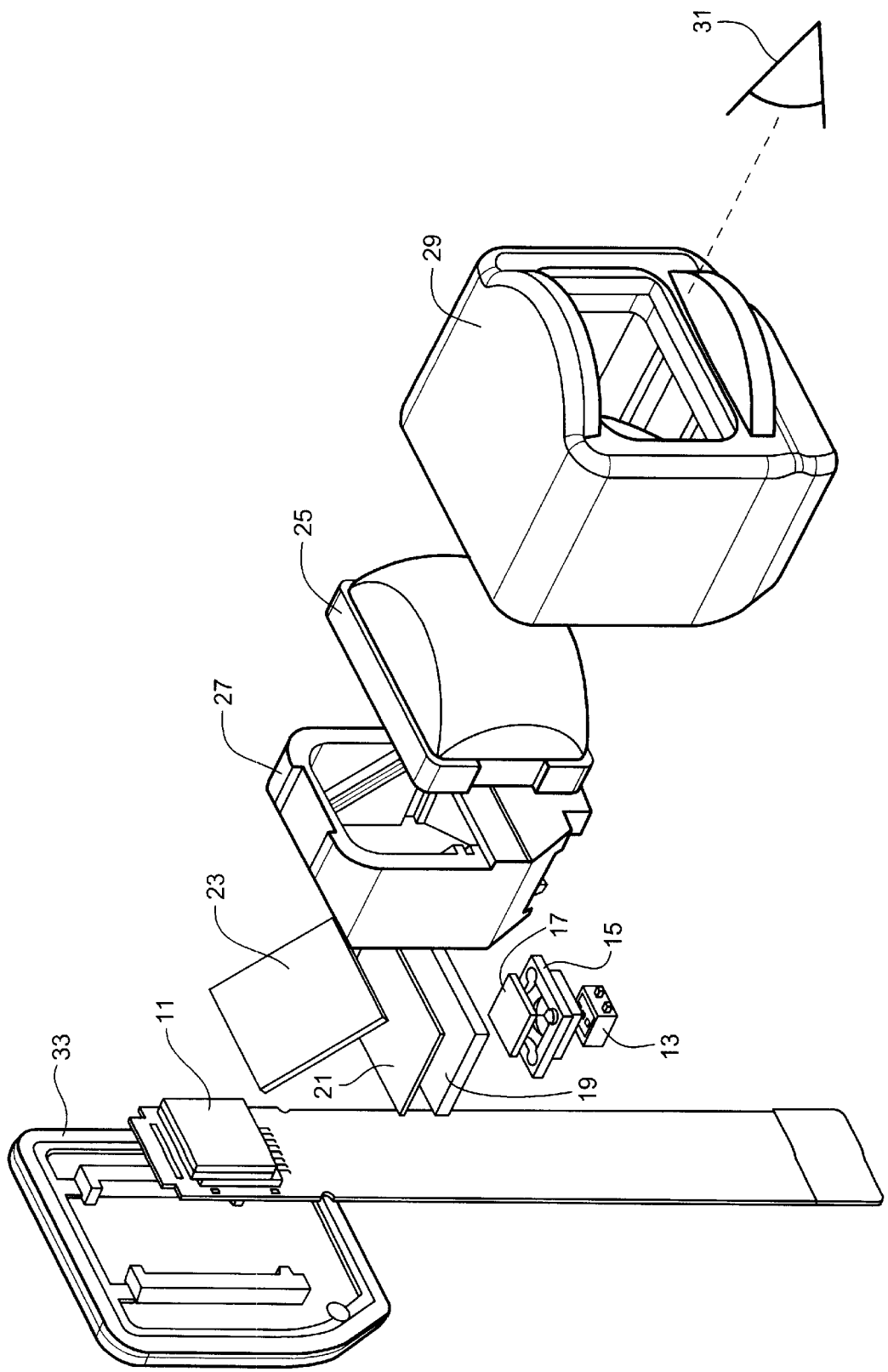
FIG. 1 is an exploded perspective view of a micro display system incorporating one embodiment of the present invention.

FIG. 1 shows a simple, low-cost, micro-display system that is particularly well-suited to the novel illuminator of the present invention. The system of FIG. 1 includes a reflective micro-display 11, however, it can be adapted for use with a transmissive micro-display as discussed below. In one embodiment, the micro display is a Liquid Crystal on Silicon (LCoS) micro-display such as the CMD8X6D and CMD8X6P available from Zight Corporation of Boulder, Colo. It provides great advantages for compact near-eye applications. LCoS micro-displays produce a high resolution image by changing the polarization state of incident light. In the dark state, a pixel reflects light with substantially no change in polarization. In the bright state, the pixel reflects light with an orthogonal rotation of the polarization. By illuminating the display with polarized light and then filtering out nearly all reflected light of that polarization, the display image can be viewed by the human eye. Other miniature displays use reflectivity changes or transmissivity changes to produce an image.

Typically, reflective displays are illuminated with pulsed red, green, and blue light while the display is synchronized to the pulsed light source to reflect the appropriate color component of the image. The rapidly alternating red, green, and blue images are blended in human perception to form the full-color image of the display. However, the display can also be illuminated with other colors, white light or with a single color light for monochromatic displays such as data or targeting displays.

The red, green and blue light can be provided by a set of LED's (Light Emitting Diodes) 13. In one embodiment, the LED's are enclosed in a small package as described in more detail with respect to FIG. 2. Alternatively, various types of other LED packages or bulbs may be used. In addition, several LED's, LED packages or bulbs may be combined together to form the light source 13. In such a package, the LED's are encased in a diffusely transparent or clear resin which fills an open ended cavity. The cavity is reflective below the resin so that light from the LED's is reflected upwards through the opening and mildly diffused. As an alternative, any type of reflective or partially reflective cavity can be used that includes a light source within the cavity and an aperture at one side for the light to escape. The LED package is assembled onto a housing or bracket 15 which holds the LED package on one side and a film stack 17 on the other. A Fresnel lens 19 is placed next to the film stack and spaced from the film stack to image the aperture stop at the film stack into the pupils. A pre-polarizer 21 is placed over the Fresnel lens.

In an LCoS embodiment, the light striking the display is rotated in polarization as mentioned above. Accordingly, the pre-polarizer can be used to eliminate all but one polarization direction. The polarizer can be made, for example, using an iodine PVA (Poly Vinyl Alcohol) film. Such a polarizer can be applied to a thin polyester substrate sheet or some other substrate or it can be applied to the Fresnel lens. However, any other suitable pre-polarizer can be used as is well known in the art. The polarized light is directed to a polarizing beam splitter (PBS) 23 that is held in place by an inner housing 27. The polarizing beam splitter can be constructed in a conventional fashion, for example, using a plastic or resin sheet, or a glass plate with a dichroic PVA.coating applied.

A variety of other known beam splitting devices can also be used as is well-known in the art such as a polymer film stack or dielectric coating stack at the diagonal beam splitting surface. One such device is a Double Brightness Enhancement Film (DBEF) available from 3M Corporation in the United States. For higher performance, a wire grid polarizer can be used as the PBS in place of a typical anisotropic-isotropic polymer film stack such as the DBEF. The DBEF distinguishes polarization states less effectively as the angle of incidence increases and its effect varies with color. Improved skew ray contrast control can be achieved with the wire grid polarizer as a PBS. While the DBEF has a slightly lower absorption, contrast for skew rays is significantly less than for a wire grid polarizer. A wire grid polarizer is described, for example, in U.S. Pat. No. 6,122,103 to Perkins et al. A suitable wire grid polarizer is the ProFlux™ polarizer, available from Moxtek.

The polarizing beam splitter will reflect polarized light from the light source toward the display 11. Upon striking the display, a portion of the light will be reflected and rotated in polarization. This light will be transmitted through the polarizing beam splitter through an imaging lens 25 and be imaged at an exit pupil of that lens where it can be observed by the viewer 31. Another portion of the light will be reflected from the display without a change in polarization. This light will be reflected by the polarizing beam splitter back toward the light source. To reduce cost at the expense of efficiency, a half-mirror can be used instead of the polarizing beam splitter.

The imaging lens 25 is held between an inner housing 27 and an outer housing 29. The imaging lens magnifies and images the light reflected from the display through the polarizing beam splitter where it can be seen by a viewer 31. The particular design of the inner and outer housings will depend on the application to which the present invention will be put. The housings shown in FIG. 1 should be considered as examples only. The geometry of the system can also be modified to suit a desired form factor. For example, the illumination system can be placed approximately where the display is located in FIG. 1 and the display can be moved to a position above the beam splitter as shown in FIG. 1. The entire system can also be rotated or turned upside down as desired. The form factor can be changed still further by adding mirrors or prisms at any point in the system.

As can be seen in FIG. 1, the entire assembly can be positioned and held in place in inner and outer housings and then mounted to a back plate 33. The back plate holds and contains the entire assembly and can accordingly be attached to any other device as desired. The back plate can also supply the power and display driver connections required by the light source and the micro-display (not shown).

The particular design of the imaging lens can be adapted to suit a variety of different applications. While a single acrylic imaging lens is shown in the present application, a great variety of single or multiple optical element imaging systems can be used as is well known in the art. Such systems include various prism based systems. In addition, a great variety of different polarizing beam splitters can also be used. The air suspended simple polarizing beam splitter plate is particularly desirable when cost is to be minimized, however, a beam splitting cube or a variety of different prism systems can be used instead of the simple polarizing sheet suspended in air as shown in FIG. 1.

The present invention can be easily adapted for use with a transmissive display. In this case, the entire illumination system with LED package, diffuser, film stack, and Fresnel lens can be placed behind the display in the direct line of sight of the viewer. Such a design eliminates the need for the beam splitter and may eliminate the need for the pre-polarizer, provided that the transmissive display includes its own polarizer.

Figure 2:
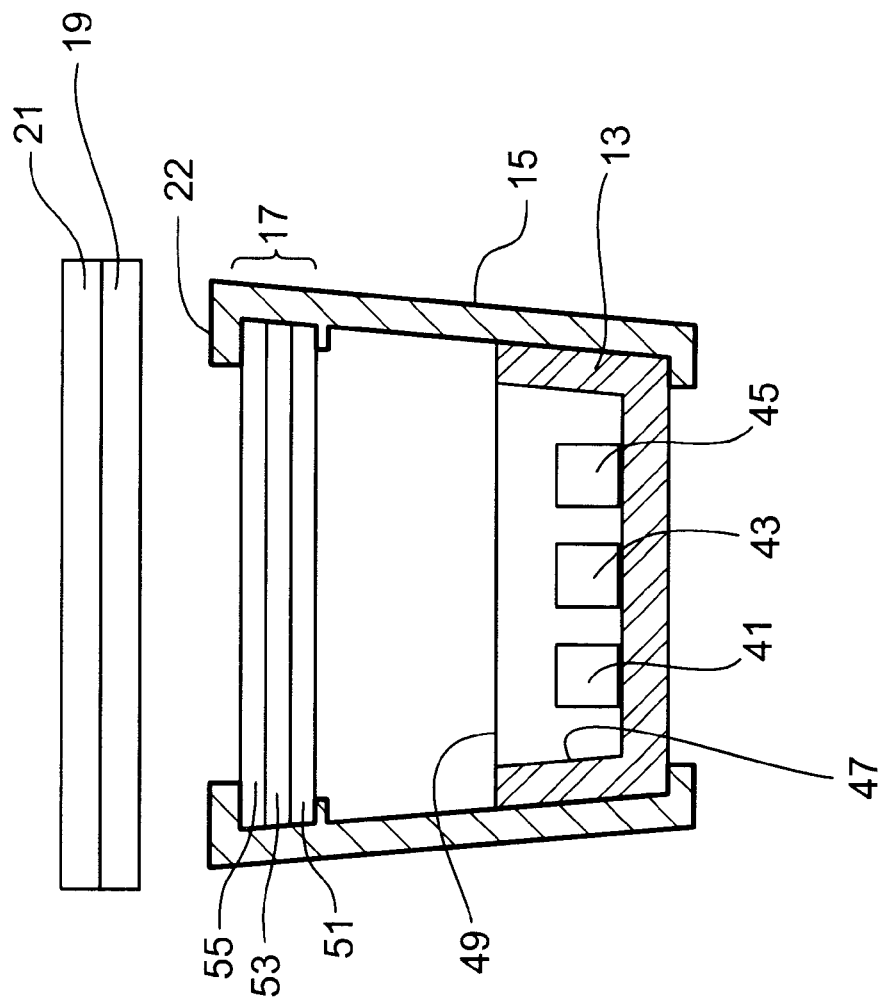
FIG. 2 is a cross sectional view of an illumination system according to the present invention.

FIG. 2 shows the illumination assembly in greater detail. As discussed above, a set of LED's 41, 43 and 45 are located within the walls 47 of a reflective cavity. The cavity is filled with a clear or diffusive resin 49. The resin seals the LED's to hold them in place and protect them from environmental conditions. In addition, the diffusely reflective cavity and resin produces a nearly Lambertian emitter that has been found to be particularly well suited to illumination of micro displays. This combination of LED's, cavity and resin is commercially available as an NSCM315C 3-in-1 RGB LED package from Nichia Corporation. However, any other type of light source can be used as is well known in the art.

The LED package 13 has an aperture 49 on one side of the reflective cavity and LED's. All of the light produced by the LED package is emitted from this aperture. A diffuser 51 is placed directly over this aperture and is held in place by a bracket 15. There is an air gap between the aperture and the diffuser which aids the effectiveness of the diffuser. In one embodiment, the aperture of the LED package is 2.6 mm by 2.6 mm and the air gap is between 0 mm and 2 mm. One type of diffuser that can be used is a double-sided bead coated polyester film selected for low absorption and high transmission such as model 100PBU available from Kimoto Corporation. This diffuser is constructed from a substantially transparent polyester film that is partially covered on both sides with small scattering beads. The beads scatter much of the light that strikes the film. Due to the double-sided nature of the bead coating much of the light will be scattered first by beads on one side of the film, traverse through the polyester substrate and then be scattered again on the other side of the film. For this diffuser, about two-thirds of the light scatters in the forward direction. The back-scattered and forward scattering yield a high degree of color mixing in a small volume.

One purpose of the diffuser is to prevent any one of the three LED's from being visibly imaged to the viewer. It compensates for the slightly off-axis locations of the three LED's in multiple color systems. When operating a color version of a display system, light from each of the three LED's will be directed to the display at different times in a repeating cycle. With some types of displays, the light can also be modulated to produce the proper gray scale image desired for that particular color. The three colors are cycled at a frame rate or speed sufficiently fast to cause the viewer's eye to integrate the three different colored gray scale images into an integrated color image. Because the exact location of each of the three different colored LED's of the light source is slightly different, if there were no diffuser, each LED would form a corresponding image in the exit pupil. Each image would be spaced apart from the images formed by the other LED's. The different LED image locations can result in shifts in the color of the perceived display image as a viewer moves across the exit pupil. The diffuser minimizes this color shift. Although the illustrated example has been described using red, green and blue light, it should be understood that the present invention is not limited to these specific colors. Also, although only three colors were described, the present invention would equally apply regardless of the number of colors of light being used.

The diffuser is selected to spread the light evenly across the exit aperture of the LED package, which reduces the locational imaging effect of the different LEDs. It is also selected to maximize efficiency of the light source. In this case, efficiency can be considered as low absorption and high transmission. It has been found that multiple, as opposed to single, scattering within the diffuser more thoroughly mixes the colors of the individual LED's. Several types of volume diffusers can be used because a volume diffuser mixes and spreads the light through scattering centers distributed throughout its volume. It has also been found that the double coated film diffuser has a higher transmission ratio than many conventional volume diffusers because the mean free path is longer and there are fewer scatting events. However, there are many other possible diffuser choices that can be selected depending on the particular application, the light source, the film stack and other design concerns.

The diffuser, by scattering light from the LED package, also greatly reduces the efficiency of the illumination system. After the diffuser, the exit angle for edge rays from the source is effectively ninety degrees from a normal to the plane of the diffuser surface. In other words, the light is uncontrolled and exits at any and all angles. In one embodiment, stray light can be filtered out so that only light within an appropriate output cone angle is transmitted from the illumination system. This approach loses much of the output of the LEDs. In another embodiment, collimating optics can be used, but this takes up significant space and will not provide a brightness gain. In another embodiment, mentioned above, a film stack is applied. The film stack does not reduce the amount of mixing of the light. It increases the brightness of the illumination system in lighting the display by reducing the numerial aperture to a greater degree than the commensurate reduction of flux. This has the effect of concentrating the light into the desired output cone angle. Accordingly, the film stack can include two layers 53 and 55 of a brightness enhancement film.

The brightness enhancement film (BEF) of the type shown in the figures can be a commercially available BEF film available from 3M Corporation under the Vikuiti brand. Such films are multi-layer films on a polyester substrate that, in the aggregate, have linear pyramidal structures. The structures have sides that meet at their apexes at an angle typically of about one hundred degrees, however, other angles can be created. In effect, the structures, after some bending of rays from the diffuser, transmit only light from the diffuser that satisfies a particular designed exit angle criterion. The exit angle range, typically plus or minus thirty-five degrees from a normal to the plane of the film, is a function of the apex angle mentioned above.

Almost all other rays will be retro-reflected back into the diffuser and the light source, where they are diffusely reflected again by the diffuser or the reflective surfaces of the LED package. In effect, many of these retro-reflected rays are recycled until they are incident on the BEF at an angle which permits them to be transmitted within the limited exit angle. This recycling creates the brightness enhancement effect that is not available through conventional absorptive filters. Accordingly, the BEF takes light from the diffuser that can have a maximum exit angle of 90 degrees and transmits light where the maximum exit angle, the angle for edge rays, is thirty-five degrees.

Using a BEF, a 40% intensity gain within the desired output cone angle of 35 degrees over a diffuser alone has been observed. If two BEFs having orthogonally oriented rows of the pyramidal structures are used, a gain of as much as 80% within an output cone angle of 25 degrees is possible. The specific results in any particular application will depend on the diffuser and the film as well as the light source configuration. The use of orthogonally oriented films produces the enhancing effect in two orthogonal planes rather than only along the axis perpendicular to the pyramidal structures, as is the case when only one set of pyramidal structures is used. In addition, using two perpendicular sheets, the output cone angle or the maximum exit angle, is reduced from thirty-five degrees about a normal to the film to twenty-five degrees.

It is not necessary that the sheets be precisely aligned. Tolerances of plus or minus five degrees or more are sufficient. More than two sheets can also be layered together. Generally, it can be considered that if the films are crossed perpendicularly, then the greatest effect can be had with the fewest number of sheets. Films may be constructed which provides structures rather than lenticular within a single sheet of material. This would allow a single sheet to be used. Typically, the structure of the film is sufficiently fine that it is imperceptible to the viewer of the display and the light intensity appears uniform. As an alternative to the two orthogonally oriented films, an array of two-dimensional micro lenses or cones may be used instead. In addition, a dual brightness enhancing film (DBEF) also available from 3m can be added to the film stack to affect brightness and polarization.

The intensity achieved for light incident on the display is greater using the film stack than for the diffuser alone. In the illustrated embodiment, the BEF is placed between the diffuser and the display, since the diffuser has a spreading effect on the angular distribution of light, while the film stack concentrates it. The uniformity of the distribution of the illumination incident on the display is very high and appears to a viewer to be as good or better than that for the light boxes of the prior art.

The bracket includes an aperture stop 22 above the film stack the illumination source as described above, to provide. a close etendue match for the imaging lens using readily available components. For comfortable viewing with the human eye, the imaging lens should produce an exit pupil with about a 6 mm diameter and a 24 degree diagonal field-of-view. The imaging lens of the illustrated embodiment is designed for these specifications. The linear etendue for such an exit pupil can be determined as 6 mm sin 12°=1.25 mm, since 12 degrees is the output half angle for the 24 degree field of view. The etendue for the illumination system can be determined as 3 mm sin 25°=1.25 mm, since the diameter of the aperture stop above the film stack is 3 mm and the output half angle for the crossed BEFs is 25 degrees. This maintenance of etendue from light source to exit pupil implies great efficiency for the system. While a close matching etendue greatly improves efficiency, an identical match is not required.

Also provided above the aperture stop of the holder 15 are the Fresnel lens 19 and pre-polarizer 21 mentioned above. These elements are not required and can be substituted for other types of collimating and light filtering elements as is well known in the art. In addition, a color correction filter can be added, if desired, to correct the color of the light source.

As can be seen in FIGS. 1 and 2, the LED's are intentionally positioned directly inside the view of the rest of the optical system directly behind the diffuser and film stack. This significantly reduces the volume of the illumination system and causes the light emitted from the LED's to directly strike the diffuser and film stack with no intermediate scatter or reflection. The light is mixed and spread using a properly configured diffuser that has multiple spaced scattering centers. This multiple, as opposed to single, scattering within the diffuser spatially mixes the colors of the individual LED's. The brightness enhancing film stack then aids in directing a great amount of this light toward the display.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in diagram form. The specific details may be supplied by one of average skill in the art as appropriate for any particular implementation.

Importantly, while embodiments of the present invention are described with reference to a single display and imaging lens, the illuminator described herein is equally applicable to any type of small display whether for one eye or both, with any type of optical imaging system. It is especially desirable when compactness and brightness are desired. For example, the techniques described herein are thought to be useful in connection with compact computer and data device displays, monocular headsets, digital camera viewfinders, camcorder viewfinders, internet appliance viewers, mobile communicator viewers and binocular stereovision entertainment headsets for video and game players.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
a light source;
a package for the light source having a reflective surface on at least one side of the light source;
a diffuser opposite the reflective surface in direct view of the light source;
a film stack to receive light through the diffuser, the film stack transmitting light within a maximum exit angle and reflecting substantially all other light to the diffuser.

2. The method of claim 1, wherein the film stack comprises a first film responsive to an incident angle of light in one axis and a second film responsive to an incident angle of light in another axis.

3. The method of claim 2, wherein the first axis and the second axis are substantially perpendicular.

4. The method of claim 2, wherein the reflected light is retro-reflected.

5. The method of claim 1, wherein the maximum exit angle of the film stack is less than the maximum exit angle of the diffuser.

6. The method of claim 1, wherein the film stack comprises a brightness enhancement film.

7. The method of claim 5, wherein the film stack comprises a pair of crossed brightness enhancement films.

8. The method of claim 1, wherein the film stack is adjacent to the diffuser and on the side of the diffuser opposite the light source.

9. The method of claim 1, wherein the diffuser is adjacent the aperture of the LED package.

10. The method of claim 1, wherein the diffuser is operative to cause multiple scattering of light from the light source.

11. The method of claim 1, wherein the light source comprises a set of LEDs and the package comprises an LED package containing the LEDs in a resin filled diffusely reflective cavity with an aperture on one surface of the resin and wherein the diffuser is adjacent the aperture.

12. The method of claim 1, further comprising a Fresnel lens adjacent the film stack opposite the diffuser.

13. The method of claim 1, further comprising an aperture stop on one side of the film stack opposite the diffuser, the size of the aperture stop being selected in consideration of a display system to be illuminated by the apparatus.

14. An apparatus comprising:
a display;
an imaging lens to magnify and image the display;
a light source to illuminate the display;
a package for the light source having a reflective surface on at least one side of the light source;
a diffuser opposite the reflective surface;
a film stack to receive light through the diffuser, the film stack transmitting light from the diffuser within a maximum exit angle and reflecting substantially all other light to the diffuser.

15. The apparatus of claim 14, wherein the display is a reflective display, the apparatus further comprising a beam splitter between the display and the imaging lens to direct light from the light source toward the display and to direct light from the display to the imaging lens.

16. The apparatus of claim 14, wherein the beam splitter is a polarizing beam splitter.

17. The apparatus of claim 16, further comprising a polarizer between the light source and the polarizing beam splitter.

18. The apparatus of claim 17, wherein the polarizer is adjacent the film stack and opposite the diffuser.

19. The apparatus of claim 14 wherein the light source is within the view of the imaging lens.

20. An apparatus comprising:
means for generating light;
means for reflecting light from the light source though an aperture, the aperture being within view of the light source;
means adjacent the aperture for diffusing the light reflected through the aperture;
means for enhancing the brightness of the diffused light within a maximum exit angle.

21. The apparatus of claim 20 wherein the means for enhancing comprises a set of thin films.

22. The apparatus of claim 20 wherein the apparatus is operative to illuminate a display imaged by an imaging lens, and wherein the light source is within the view of the imaging lens.

23. The apparatus of claim 22 further comprising an aperture stop on a side of the means for enhancing opposite the means for diffusing and wherein the aperture stop is sized in consideration of the etendue of the imaging lens.

* * * * *